and having an aperture extending longitudinally thereof, of an inner member comprising a wire or the like passing through said aperture and movable longitudinally thereof.

4. In an apparatus for transmitting power, the combination with a flexible inner member, of a flexible outer member comprising a plurality of sections fitting within but separable from and unconnected to each other, one of said members being slidable longitudinally of the other.

5. In an apparatus for transmitting power, the combination of a flexible outer member comprising a plurality of sections fitting within but separable from and unconnected to each other, said sections being provided with an aperture therethrough, and an inner member comprising a wire or the like mounted in and longitudinally movable through said outer member.

In witness whereof I have hereunto set my hand in presence of two witnesses.

A. H. EDWARDS.

No. 703,905. Patented July 1, 1902.
A. S. ELMORE.
APPARATUS FOR THE SEPARATION OF MINERALS BY THE SELECTIVE ACTION OF OILS, &c.
(Application filed Aug. 8, 1901.)
(No Model.)
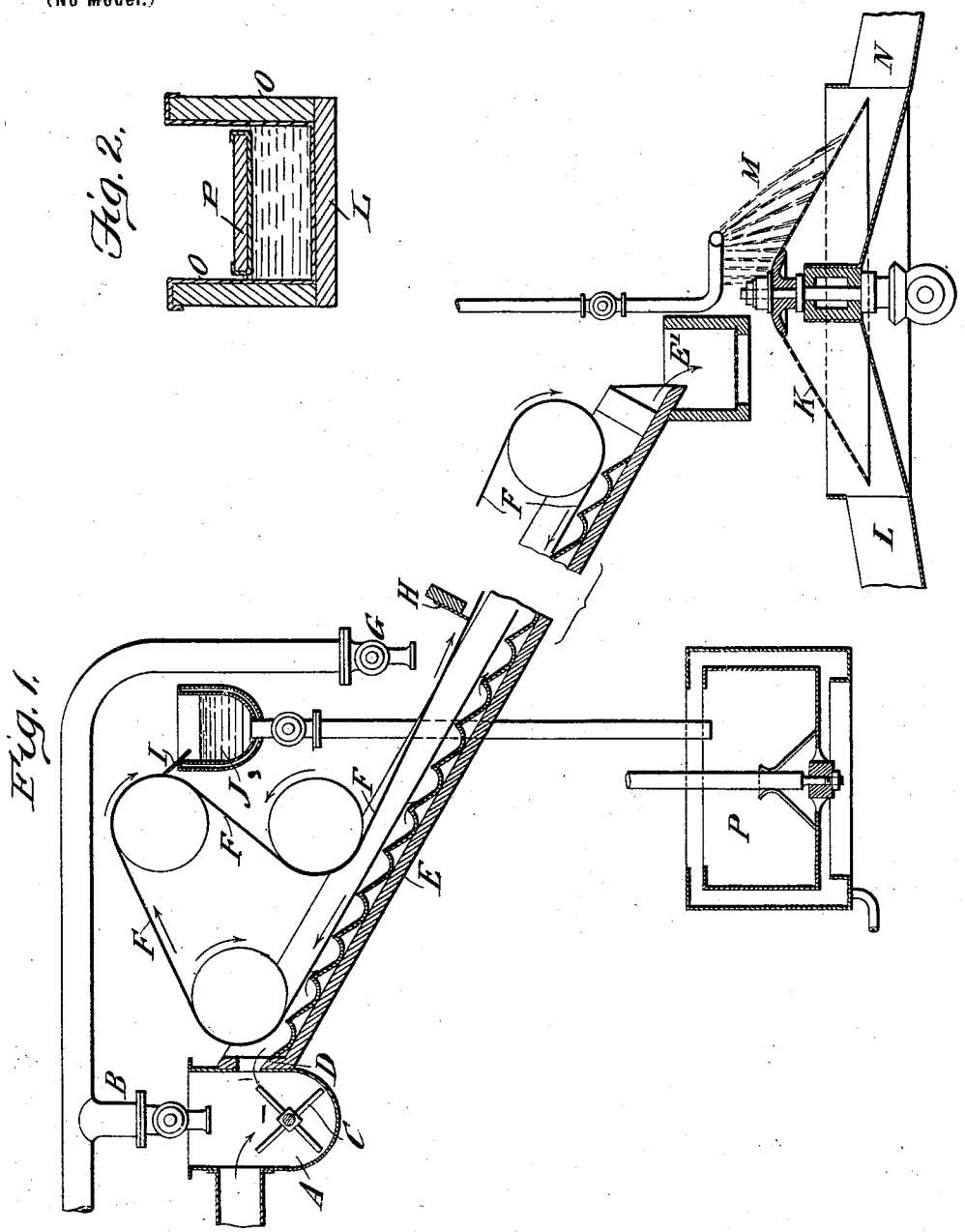

Witnesses:
 ALFRED NUTTING,
 H. A. GREENGRASS.